(12) United States Patent
Douglas et al.

(10) Patent No.: US 6,833,032 B1
(45) Date of Patent: Dec. 21, 2004

(54) AUTOMATIC DELIMING PROCESS

(75) Inventors: Scott Douglas, Burlington, VT (US); John Bardeau, Essex Jct, VT (US)

(73) Assignee: Blodgett Holdings, Inc., Burlington, VT (US)

( * ) Notice: Subject to any disclaimer, the term of this patent is extended or adjusted under 35 U.S.C. 154(b) by 64 days.

(21) Appl. No.: 10/287,691

(22) Filed: Nov. 5, 2002

(51) Int. Cl.[7] .............................................. B08B 7/04
(52) U.S. Cl. ..................... 134/3; 134/2; 134/18; 134/19; 134/22.1; 134/22.11; 134/22.12; 134/22.14; 134/22.15; 134/22.19; 134/26; 134/27; 134/28; 134/34; 134/35; 134/36; 134/41; 126/273 R; 126/275 E; 122/379
(58) Field of Search .......................... 134/2, 3, 18, 19, 134/22.1, 22.12, 22.14, 22.15, 22.19, 26, 27, 28, 34, 35, 36, 41; 126/273 R, 275 E; 122/379

(56) References Cited

U.S. PATENT DOCUMENTS

| | | | |
|---|---|---|---|
| 4,991,545 A | * | 2/1991 | Rabe et al. .................. 122/382 |
| 5,152,252 A | | 10/1992 | Bolton et al. ................ 122/401 |
| 5,193,491 A | | 3/1993 | Oslin et al. .................. 122/401 |
| 5,279,676 A | | 1/1994 | Oslin et al. ................. 134/22.1 |
| 5,368,008 A | | 11/1994 | Oslin .......................... 126/20.2 |
| 5,549,038 A | | 8/1996 | Kolvites ....................... 99/330 |
| 5,564,595 A | | 10/1996 | Minissian ..................... 222/59 |
| 5,631,033 A | | 5/1997 | Kolvites ...................... 126/233 |
| 5,640,946 A | | 6/1997 | Oslin ........................... 126/20 |
| 6,236,321 B1 | | 5/2001 | Troost, IV .................. 340/588 |

* cited by examiner

*Primary Examiner*—Sharidan Carrillo
(74) *Attorney, Agent, or Firm*—Brinks Hofer Gilson & Lione

(57) ABSTRACT

An automatic deliming process for a steam oven cooker is described. The process initiates a deliming procedure after a predetermined time of normal operation, which period of time is determined by the hardness of the water in the local area. Upon the expiration of this period of time a microprocessor signals an operator to shut down normal operation of the oven, and initiate the deliming process. The microprocessor then activates a peristaltic pump which injects a predetermined quantity of deliming liquid from an external reservoir into the generator. After the deliming time has passed and the generator contents have cooled to 140° F. the microprocessor automatically activates a drain pump to drain the deliming solution from the generator. Subsequently the microprocessor activates a fill-solenoid opening and inlet from a reservoir of rinse water into the generator to rinse the same. The microprocessor then again opens the drain to drain the rinse water, and normal operation is resumed.

3 Claims, 4 Drawing Sheets

Oven Side View

AUTOMATIC DELIMING PROCESS

FIELD OF THE INVENTION

This invention relates to steam cookers, and in particular to a process for automatically deliming the cookers at predetermined intervals to avoid damage caused by lime deposits.

BACKGROUND OF THE INVENTION

Commercial cooking ovens that use a steam generator are well known, as are ovens that use a combination of steam and convection air cycles. As water evaporates, however, lime scale deposits form on the surface of the steam generator and it is known to use a deliming solution to remove the scale. Such deposits are a major problem especially with commercial cookers because the deposits formed defeat the efficiency by interfering with heat exchange and with water flow or by disrupting the liquid level sensing system typical in such devices.

The oven operator must pour a deliming agent directly into the steam generator using an internally or externally mounted reservoir. This procedure is labor intensive and therefore often is not performed or performed infrequently resulting in damage to the steam generator.

In U.S. Pat. No. 5,152,252 there is described the use of a controller which controls both feed water input to a boiler and the addition of chemicals to that feed water. The chemicals are only added with the feed water so that if the flow of feed water stops the chemical application stops. The invention described, however, is directed to a large boiler such as one used to heat an office building and super heated water flows under pressure from the boiler to an appliance where the pressure is reduced to convert the water to steam. A separate feed water tank is provided outside of the boiler and condensate from the appliance or building is returned to that feed water tank for recycling. There is then no disclosure relative to a table top steam cooker wherein an internal water supply generates steam used to cook food.

In U.S. Pat. Nos. 5,193,491; 5,279,676; 5,368,008; and 5,640,946 a steamer apparatus is described wherein cleaning and deliming agents are introduced into the steam generator through the steam lines connecting the generator and the oven. This is done manually, however.

U.S. Pat. No. 5,193,491 describes a boiler separate from the cooking chamber and a reservoir for descaling solution all housed within a common cabinet. There is no disclosure of a steamer disposed within the cooking chamber and a remote reservoir and pump whereby heat problems from steam generated would not affect the reservoir. The reservoir is described as being constructed from an acid resistant polypropylene or other suitable plastic material. In U.S. Pat. No. 5,368,006 the deliming solution is added through a funnel into the steam inlay housing for manual introduction of the solution into the boiler. U.S. Pat. No. 5,279,676 is a division of U.S. Pat. No. 5,193,491 and therefore similarly disposes the identical unit. Finally, U.S. Pat. No. 5,640,946 is a division of U.S. Pat. No. 5,268,008 and therefore describes the same unit as is described in that patent.

Also, in U.S. Pat. Nos. 5,549,038 and 5,631,033 a sensor is used to activate a timing circuit to shut down the steamer when it is necessary to delime. The deliming process, however, is not automatic but the timer provides an indicator to the operator that the oven is ready to delime and since the steam generator is automatically shut down the deliming process occurs when necessary, but manually. In these patents a timing circuit is used with a preset timing period. The time necessary to heat water is measured and if it meets a predetermined period no indication is given. However, if the timed perod is excessive an indicator light is triggered. The operator can override the indicator light once. In a subsequent time if the time period is exceeded the steam generator circuit is disabled. Prior to disabling, however, the steam generator circuit will be allowed to increase the steam temperature to 193° F. which the patent specification indicates accelerates the activity of deliming solutions. Subsequent to deliming, the heater is flushed with water to remove the deliming solution.

Finally, chemical dispensing systems are described in U.S. Pat. Nos. 5,564,595 and 6,236,321 wherein the dispensing of chemicals is controlled by a microprocessor. U.S. Pat. No. 6,236,321, however, describes use in a hot water heater not a steam generator, and uses a sensed increase in reheat time to initiate a clean out alert.

Accordingly there is a need for a process for not only notifying an operator when it is necessary to delime, but also for automatically deliming the steam generator in a commercial steamer oven with a minimal involvement by an operator so that the deliming process will proceed at an optimum time to maximize the overall efficiency of a steamer oven.

SUMMARY OF THE INVENTION

According to the process of this invention a microprocessor is used which controls a peristaltic pump, a cold water inlet fill-solenoid and a waste drain pump. The microprocessor also controls the user interface on the machine which includes a signal such as a light used to indicate to the operator when the deliming process is to proceed. The interval between deliming is based upon water hardness which in turn can be determined using well known publicly available data for a particular geographic area and not on a measure of the time necessary to reheat the water. The interval then is set with a potentiometer couple to the microprocessor.

The cooking device runs normally until the deliming day interval is reached and at this point an indicator lamp on the front panel flashes, prompting the operator to start the deliming process. At this point the operator may choose not to start the process and can continue using the oven. The operator can start the process at any time, most likely at the end of the day.

The operator then starts the deliming process by turning the appliance into the cool down, and pressing a button sending an input signal to the microprocessor controller.

The controller then sends the appliance into a non-cooking state and starts the deliming process by heating the steam generator to insure the water is above 180° F. Then, a peristaltic pump is activated for a period of time pumping a predetermined amount of deliming agent from a reservoir external to the device into the steam generator. The controller then deactivates the pump and initiates a timer for the correct period of time to allow the deliming agent to work. The controller then empties the steam generator by running a discharge pump and adds a fresh water to rinse the steam generator through the fresh water solenoid after the rinse the steam generator is emptied by running the discharge pump and subsequently the appliance is reset to a cooking enabled state and the interval counter also is reset for the number of steam generator run hours to the next deliming process.

The microprocessor records the date of the deliming process in non-volatile RAM. The records stored in the non-volatile RAM can be accessed via a computer, or PDA using a serial data connection to the microprocessor, the microprocessor also records, the different steps of the deliming process into NVRAM. In case of a power fail, the microprocessor has battery backup, and will restart the deliming process where it left off before the power fail.

The process then involves only minor operator activity as the microprocessor controls the deliming process and when it is to be initiated.

Accordingly it is an object of this invention to provide an automatic deliming process using a microprocessor to control when the process is initiated and to control the actual deliming process itself.

It is another object of this invention to provide a timed deliming process for a commercial steam cooker wherein a controlled volume of deliming solution is automatically added to the steam generator during the deliming process, and removed after a pre-selected period of time so that the generator can be rinsed and reset to a cooking mode.

It is another object of this invention to provide a microprocessor for controlling the deliming process for a commercial steam cooker wherein the microprocessor controls a peristaltic pump for adding deliming solution to the steam generator, controls the discharge pump for removing the spent deliming solution from the generator, controls a fresh water inlet for rinsing the generator and further controls the pump for removing the rinse water.

These and other objects will become apparent with reference to the drawings and following description wherein:

BRIEF DESCRIPTION OF THE DRAWINGS

FIG. 1b is a front view of an oven operable according to FIG. 1a.

DETAILED DESCRIPTION OF THE INVENTION

Figure 1A:
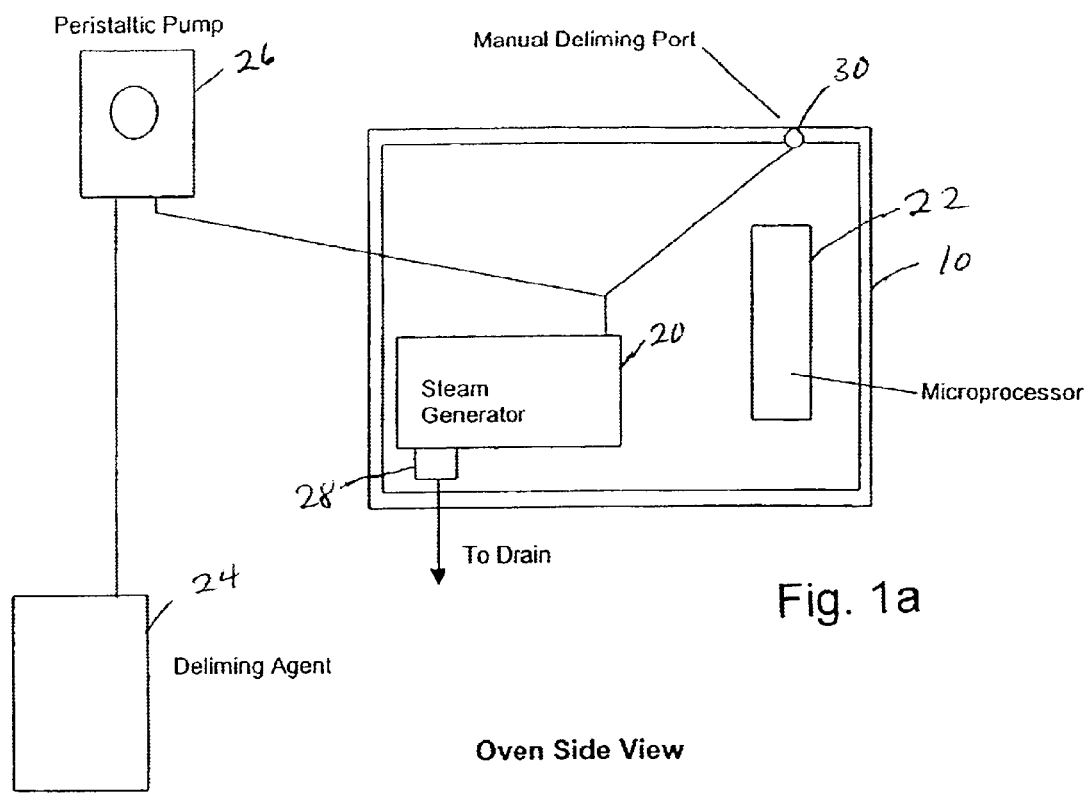
FIG. 1a is a schematic representation of a typical steamer oven according to this invention.
Figure 1B:
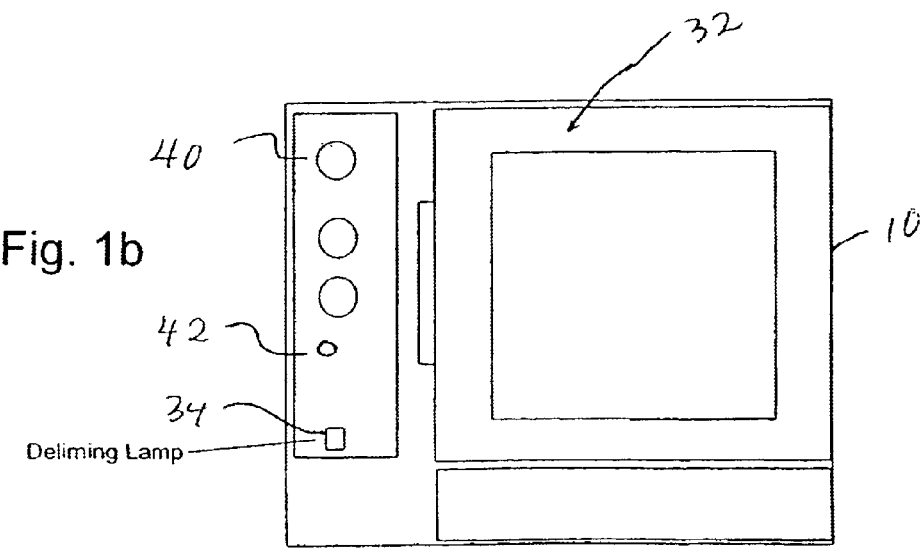

With attention to the drawings and to FIGS. 1a and 1b in particular a cooking device 10 can be a steamer, or a combination of steam and convection heating or hot air oven. This invention is not intended to be limited to a steamer oven but could be any type of cooking device which includes a steam generator. Steam generator 20 is internal to the cooking device 10. The device will use a microprocessor 22 and will include an external deliming reservoir 24, and associated peristaltic pump 26, and a drain pump 28 in communication with the steam generator as will be subsequently explained. The device can include a manual deliming port 30 which will permit the manual addition of deliming agent to the steam generator, if the peristaltic pump 22 and reservoir 24 are not used. In addition, at the user interface 32, a warning light 34 is provided as will be, subsequently explained for notifying an operator when a deliming cycle is due to occur.

Figure 2:
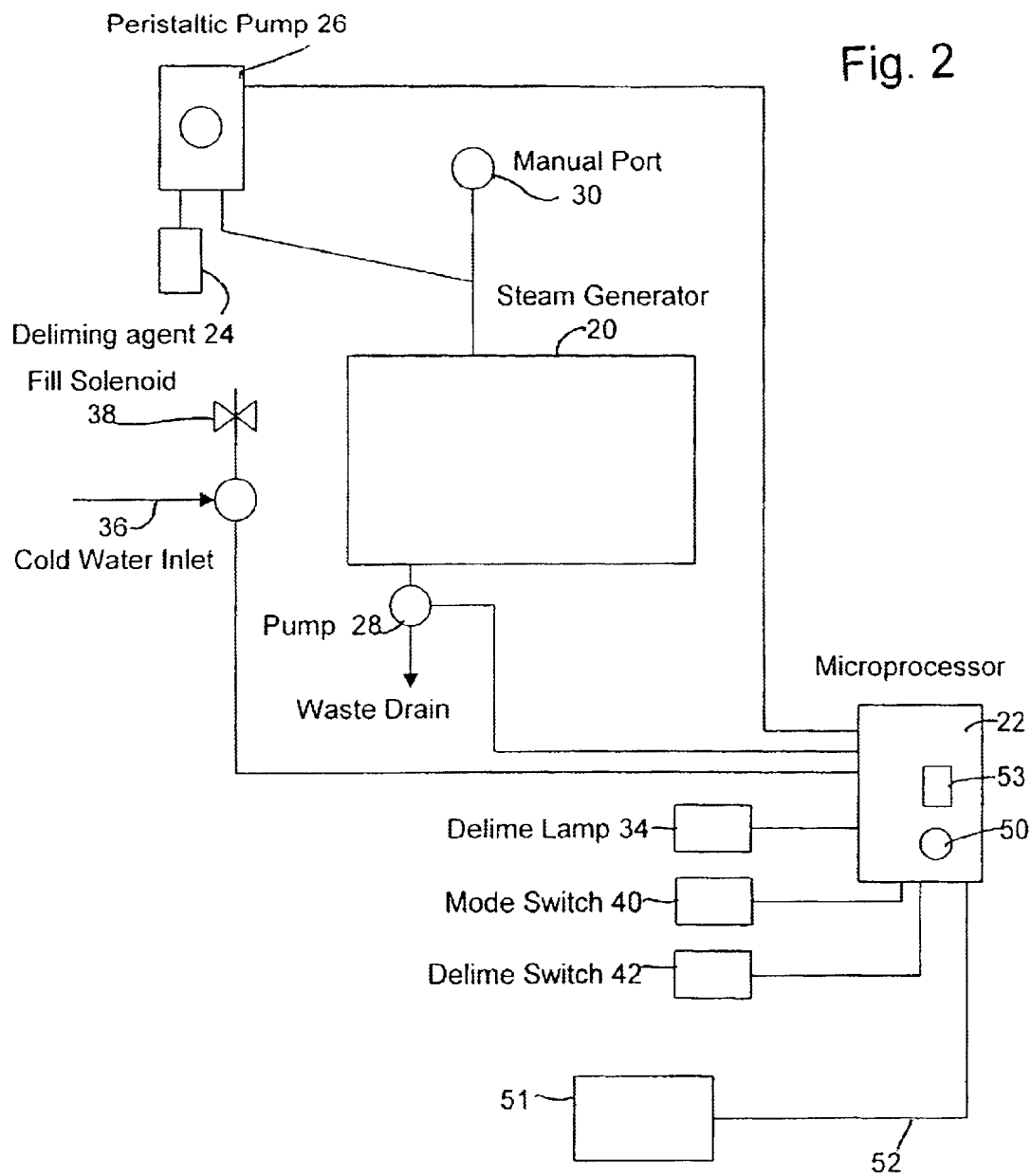
FIG. 2 is a schematic representation of the equipment used according to this invention

With attention to FIG. 2, the microprocessor 22 controls the peristaltic pump 26, the cold water inlet 36, and the inlet solenoid 38. The microprocessor 22 also controls the drain pump 28, and is provided with a mode switch 40 indicating a cooking or non-cooking state and a delime switch 42 as will be subsequently explained.

Figure 3A:
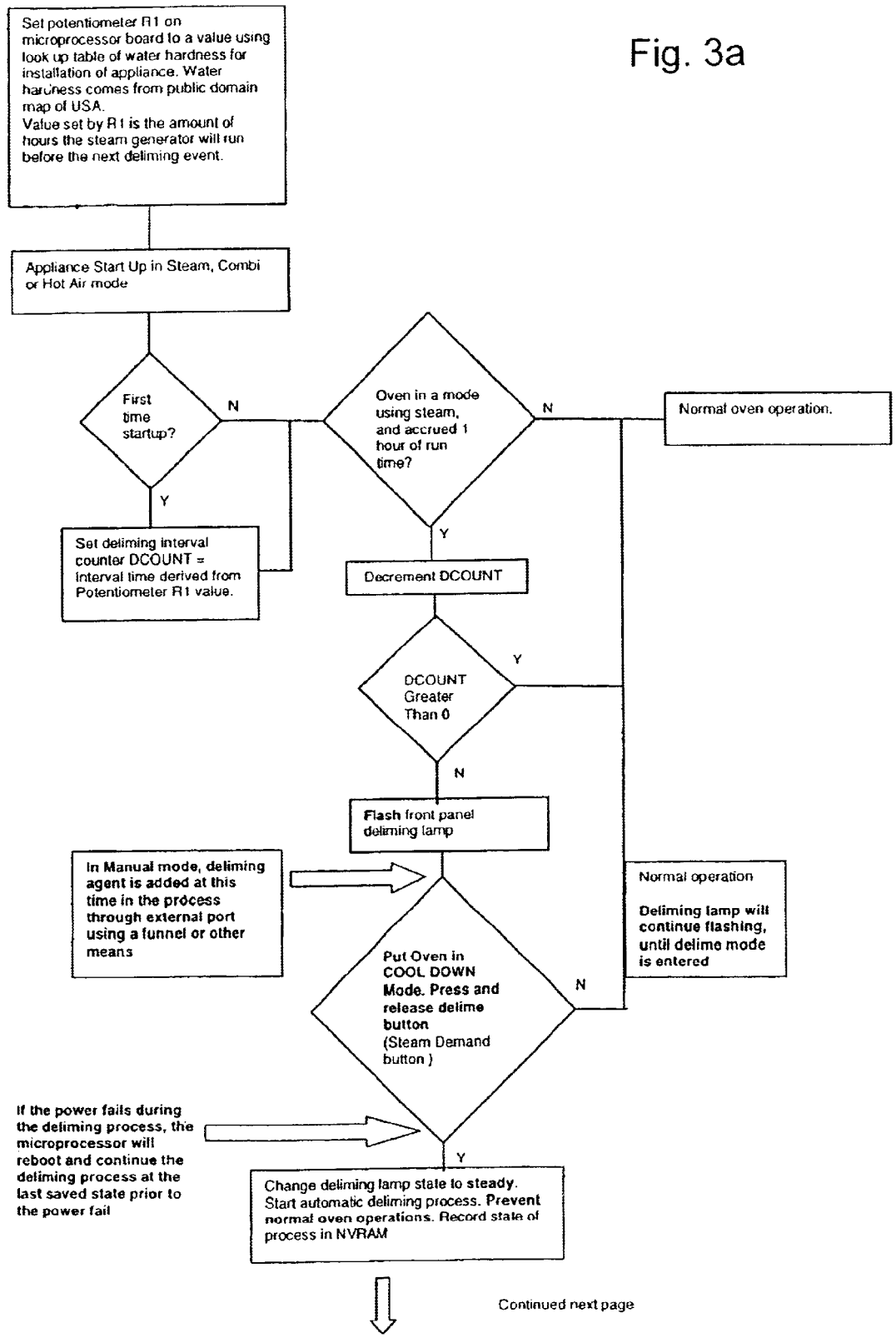
FIG. 3a is a flow chart of the process of this invention.
Figure 3B:
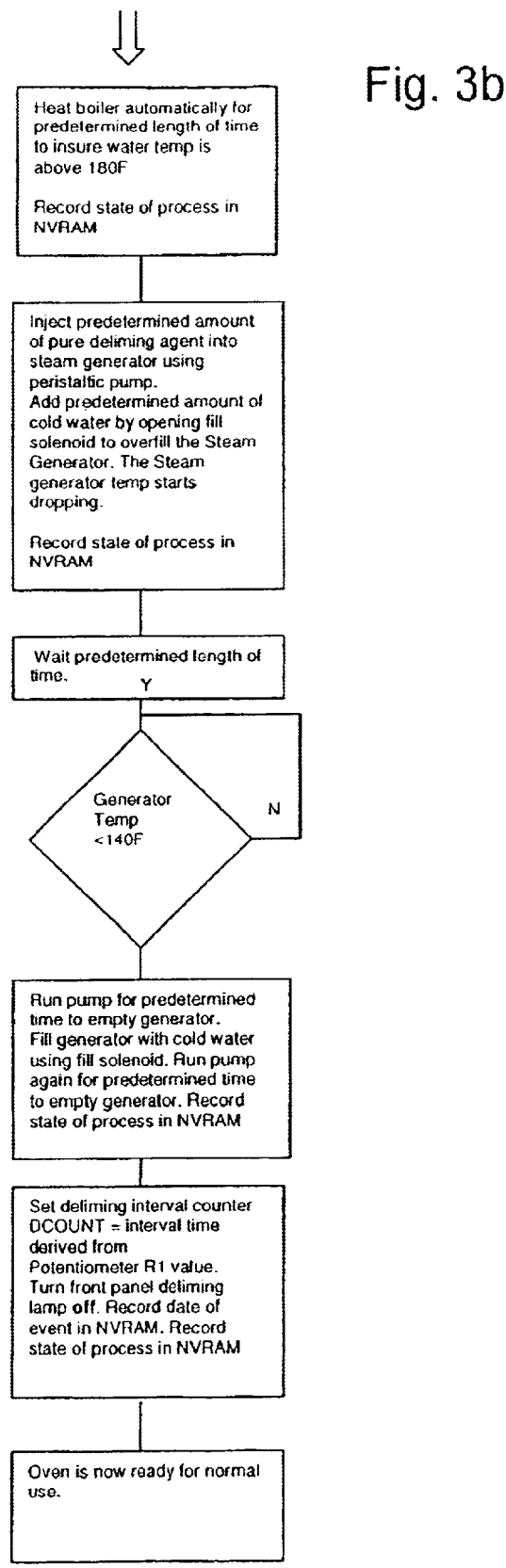
FIG. 3b is a continuation of the process of FIG. 3a to completion thereof.

FIGS. 3a and 3b illustrate the flow sheet or the automatic operation according to the process of this invention, and also an alternative manual procedure. Initially, it is necessary to determine water hardness, and that figure for a particular locality is readily available from public domain sources as will be obvious to those skilled in the art. In the microprocessor of this invention, a potentiometer RI 50 is then set to the predetermined number of hours that the steam generator will run before the next deliming event. At first time startup (reboot) of the microprocessor, the potentiometer RI 50 value is read, and converted into hours of steam generator run time, and placed into interval counter d-count. D-count is decremented for every hour the steam generator runs, during the normal oven operation. At the expiration of the preset time d-count the deliming lamp 34 will flash signaling the need for deliming. The light will continue flashing until the deliming mode is entered, and not prevent normal oven operation. To initiate the deliming process the end user puts the oven in cool down mode and in conjunction it is necessary to press and release the delime button.

The microprocessor then initiates a prevent for normal oven operations and then heats the boiler for a predetermined time to insure that the water temperature therein is above 180° F. The microprocessor then activates the peristaltic pump and a predetermined quantity of the deliming agent is injected into the steam generator. A preferred pump is available from Clark Solutions of Hudson, Mass., model M500, or Barnant Co. of Barrington, Ill., model 900-0979.

The deliming agent for dissolving the scale in the boiler is typically a strong acid such as phosphoric acid, and a preferred deliming agent is available from EcoLab, Inc. of St. Paul, Minn.

After the deliming agent is injected into the generator a predetermined length of time is allowed to pass until the generator reaches a temperature of less than 140° F. In many localities hot liquid above the temperature of 140° F. cannot be released into a sewer system or the like. The microprocessor then activates the pump 28 to drain the generator. Subsequently, the microprocessor activates the fill-solenoid 38 at the cool water inlet 36 to inject rinse water into the generator. The pump 28 is then reactivated to drain the generator. The deliming interval counter is then reloaded with the interval time, front panel deliming light is off, and the oven is now ready to resume normal use.

In manual operation using the manual port 30, deliming agent is added using a funnel or other means. The delime button is pressed, then released. The oven is then prevented from normal operation and the boiler is heated until the water temperature is above 180° F. Subsequently, after an expiration of a predetermined period of time until the generator reaches a temperature of less than 140° F. the deliming solution remains in the generator. As in the automatic process, the pump 28 is then activated to drain the deliming solution from the generator. The fill-solenoid is then activated to fill the generator with rinse water. Subsequently the pump 28 is reactivated to drain the rinse water, the deliming interval counter is reloaded with interval time, and normal operation of the oven is resumed.

Manual operation would not normally be used unless there is a breakdown in the automatic system, or in the case where the end user did not want to purchase the peristaltic pump and reservoir arrangement. Manual operation requires an operator to initiate each of the above steps and therefore requires a skilled operator familiar with the process and apparatus.

In the automatic operation of this invention, the operator merely sets the mode and presses the delime button. The remaining steps of the deliming process then proceed under direction of a microprocessor to completion.

It is important to note that the process of this invention does not rely on measuring reheating efficiency to initiate deliming and thereby avoids complicated circuitry and hardware used for such measurements. The process of this invention relies upon empirical data specific to a particular locality on water hardness.

The microprocessor records the date of each deliming event in non-volatile RAM 53. The records stored in non-volatile RAM can be accessed by a computer or PDA 51 using a serial RS-232 connection 52.

The microprocessor records each step of the deliming process in non-volatile RAM. In case of a power failure, the microprocessor has battery backup, and upon power restoration, the deliming process will continue where it left off prior to the power fail.

It will be readily seen by one of ordinary skill in the art the present invention fulfills all of the objects set forth above. After reading the foregoing specification, one of ordinary skill will be able to effect various changes, substitutions or equivalents and various other aspects of the invention as broadly disclosed herein. It is therefore intended that the protection granted hereon be limited only by the definition contained in the appended claims and equivalents thereof.

What is claimed is:

1. A process for automatically deliming a steam generator in a cooking oven wherein steam is a cooking medium comprising the steps of:

providing an oven with an internal steam generator having first and second inlets and at least one outlet, a source of water communicating with said generator, an external reservoir of deliming liquid, a drain pump coupled to said at least one outlet, a fill-solenoid coupled between said first inlet and said source of water and a peristaltic pump having an inlet coupled to said reservoir and an outlet coupled to said second inlet;

providing a microprocessor controller controlling at least said peristaltic pump, fill-solenoid and drain pump;

(a) determining a time interval between successive deliming cycles of the generator based upon water hardness;

(b) programming said controller to signal when said interval has been reached;

(c) initiating a deliming cycle by said microprocessor by automatically heating the water in the generator to a temperature above 180° F. in response to said signal;

(d) automatically activating said peristaltic pump to inject a predetermined amount of deliming liquid from said reservoir into said generator;

(e) permitting said generator to cool;

(f) automatically activating said drain pump to drain the generator after a predetermined period of time and when the temperature of water and deliming liquid has cooled to 140° F.;

(g) automatically opening said fill-solenoid to admit rinse water for rinsing into said generator; and (h) automatically activating said drain pump to drain said generator.

2. The process of claim 1 further comprising:

returning said oven to normal operation and repeating steps (c) through (h).

3. The process of claim 1 wherein said signal is a flashing light, and the oven manually ceases normal operation prior to initiating the deliming cycle.

* * * * *